United States Patent [19]

Amano

[11] Patent Number: 5,376,204
[45] Date of Patent: Dec. 27, 1994

[54] INK JET HEAD MANUFACTURING METHOD

[75] Inventor: Toshio Amano, Kyoto, Japan

[73] Assignee: Rohm Co., Ltd., Kyoto, Japan

[21] Appl. No.: 110,357

[22] Filed: Aug. 23, 1993

[30] Foreign Application Priority Data

Aug. 27, 1992 [JP] Japan .................. 4-228785

[51] Int. Cl.$^5$ ............ B32B 31/00; C09J 5/06
[52] U.S. Cl. .................... 156/234; 156/249; 156/321
[58] Field of Search ......... 156/234, 249, 290, 321, 156/322, 324.4; 29/890.1; 346/140 R; 427/314

[56] References Cited

U.S. PATENT DOCUMENTS

| | | | |
|---|---|---|---|
| 4,225,379 | 9/1980 | Ishii et al. | 156/322 |
| 4,229,751 | 10/1980 | Tamai | 346/140 R |
| 4,334,234 | 6/1982 | Shirato et al. | 346/140 R |
| 4,678,529 | 7/1987 | Drake et al. | 156/234 |
| 5,148,193 | 9/1992 | Inamoto et al. | 156/234 |

FOREIGN PATENT DOCUMENTS 414458 1/1992 Japan .

*Primary Examiner*—Michael W. Ball
*Assistant Examiner*—Richard Crispino

[57] ABSTRACT

In an ink jet head manufacturing method, a head substrate is heated, and then an adhesive sheet having an adhesive layer is placed on the head substrate so as to bring the adhesive layer in contact with one surface of the substrate so that the adhesive layer only at portions in contact with the substrate is softened by the temperature of the substrate and is transferred to the substrate as the adhesive sheet is peeled off the substrate. Then a nozzle plate is placed on the head substrate in such a manner that small holes of the nozzle plate are aligned with ink ejection openings of the substrate, whereupon the nozzle plate is reheated under pressure so as to be attached to the substrate. Since the adhesive layer is transferred to the substrate, it is possible to effectively prevent the adhesive agent from protruding into the openings and hence to improve the nozzle density. It is also not necessary to previously provide the adhesive sheet with any holes.

6 Claims, 3 Drawing Sheets

INK JET HEAD MANUFACTURING METHOD

BACKGROUND OF THE INVENTION

1. Field of the Invention

This invention relates to a method of manufacturing an ink jet head to be used in an ink jet printer or the like, and more particularly to a method of manufacturing an ink jet head which is composed of a head substrate having ink passageways and Ink ejection openings, and a nozzle plate attached to the head substrate with an adhesive agent.

2. Description of the Related Art

Generally, in manufacturing an ink jet head, a head substrate having a plurality of ink ejection openings arranged in rows is used.

FIG. 3 of the accompanying drawings illustrates a conventional method for manufacturing such an ink jet head.

As shown in FIG. 3, a plurality of ink ejection openings (hereinafter called "openings") 12 are formed in rows in a head substrate 10. Then a nozzle plate 14 is attached to the opening-side surface 10a of the head substrate 10 by means of an adhesive sheet 16. The adhesive sheet 16 is composed of a polyimide film as a reinforcement and a pair of adhesive layers attached to opposite surfaces of the polyimide film. The reinforcement has a thickness of about 25 $\mu$m, and each of the adhesive layers has a thickness of about 10 $\mu$m.

The resulting adhesive sheet 16 is sandwiched between the head substrate 10 and the nozzle plate 14, and the head substrate 10 and the nozzle plate 14 are then fixedly attached to one another by heatsetting the adhesive sheet 16.

Given that the nozzle plate 14 is fixedly attached to the head substrate 10, it is possible to jet out ink from fine ink jet nozzles (hereinafter called "nozzles") 18 precisely and accurately formed in the nozzle plate 14. If the nozzle plate 14 is formed of a stainless steel sheet or the like, it is possible to improve the rigidness of the whole ink jet head.

However, in the conventional method, since the head substrate 10 and the nozzle plate 14 are attached to one another by heatsetting the adhesive sheet 16 sandwiched therebetween, it is also necessary to form small holes 20 in the adhesive sheet 16 so as to communicate with the openings 12. The small holes 20 have to be formed at very fine spaces with precision, which would be extremely difficult to achieve.

As a consequence, mispositioning of the small holes 20 in the adhesive sheet 16 would occur so that part of the adhesive layer of the adhesive sheet 16 would flow into the openings 12 of the head substrate 10 and become hard there while the head substrate 10 and the nozzle plate 14 are being joined together using the adhesive sheet 16 in which the small holes 20 have been displaced. This would impair the proper ink jetting action.

There is a limit in reducing the diameter of the individual small holes of the adhesive sheet 16. Therefore, if the nozzles and openings 12 are formed in such a high density that the distance between the openings 12 is smaller than the diameter of the small hole 20, the individual small holes would overlap one another to form combined elongate holes so that the independency between the individual openings and hence the independency between the individual nozzles cannot be achieved, thus unabling high-quality printing.

SUMMARY OF THE INVENTION

With the foregoing problems in mind, it is an object of this invention to provide an ink jet head manufacturing method in which even in the case of high nozzle density, the adhesive layer of an adhesive sheet can be effectively prevented from flowing into the ink ejection openings of a head substrate while a nozzle plate is attached to the head substrate.

According to the invention, there is provided a method of manufacturing an ink jet head including a nozzle plate which is fixedly attached to a head substrate having a plurality of ink passageways and a plurality of ink eJectlon openings communicating with the respective ink passageways and which has a plurality of nozzle holes adapted to communicate with the respective ink ejection openings, said method comprising the steps of: (a) heating the head substrate up to a predetermined temperature; (b) applying an adhesive sheet, which has an adhesive layer on one surface, onto the ink-ejection-opening-side surface and a reinforcing of the heated head substrate, softening the adhesive layer and transferring the softened adhesive layer so that it bonds to the head substrate; (c) peeling, after said applying, softening and transferring steps, the reinforcing layer of the adhesive sheet from the head substrate, while leaving on the adhesive sheet all parts of the adhesive layer except parts facing the ink ejection openings; (d) positioning, after said peeling step, the nozzle plate on the transferred adhesive layer so as to communicate with the respective nozzle holes and the respective ink ejection openings; and (e) heatsetting, after said positioning step, the adhesJve layer by heating under, pressure to attach the nozzle plate to the head substrate.

In this ink jet head manufacturing method, the head substrate is heated, and the adhesive sheet having the adhesive layer is brought into contact with the opening-side surface of the head substrate. Since the head substrate i.s heated, the adhesive layer will become soft and attach to the head substrate. In other words, all parts of the adhesive layer except portions facing the nozzles will be transferred to the head substrate. When the adhesive sheet is peeled off, the contacted adhesive layer portions will be left on the head substrate; this is, the adhesive layer will be transferred to the head substrate over the entire surface except the nozzle portions. This is because the adhesive layer of the adhesive sheet cannot come into contact with the openings of the head substrate and hence will not be softened so that such non-contact layer portions will be removed from the head substrate when the adhesive sheet is peeled off.

In the final step, the nozzle plate having plural nozzles is attached to the head substrate in such a manner that the nozzles communicate with respective openings of the head substrate. Thus the ink jet head has been obtained.

Since the adhesive layer can be attached to the head substrate precisely over the entire surface except the opening portions using the transfer-type adhesive sheet, it is possible to guarantee prevention of the adhesive agent from flowing into the openings of the head substrate while the nozzle plate is attached to the head substrate. Namely, since there is no possibility that the adhesive agent will protrude into the openings, it is possible to effectively prevent the adhesive agent from flowing into the openings.

Further, since unlike the conventional method it is not necessary to provide the adhesive sheet with small holes corresponding to the openings or nozzles, it is also possible to reduce the working time.

DETAILED DESCRIPTION

One embodiment of this Invention will now be described in detail with reference to the accompanying drawings.

FIGS. 1A through 1F show individual steps of a manufacturing method of this embodiment.

Figure 1A:
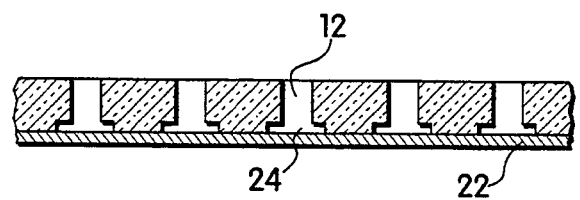
FIGS. 1A through 1F are step-by-step diagrams showing a manufacturing method according to one embodiment of this invention.

FIG. 1A shows a head substrate 10 to which a diaphragm 22 is connected. The head substrate 10 has a plurality of ink passageways 24 at predetermined distances and a plurality of ink eJectlon openings 12 communicating with the respective ink passageways 24. The diameter of the individual opening 12 is about 150 $\mu$m, for example.

In this embodiment, at the first step, the head substrate 10 is heated within a range of 60° C. to 70° C. The head substrate 10 may be made of photosensitive glass or resin so that a fine pattern can be formed thereon.

Figure 1B:
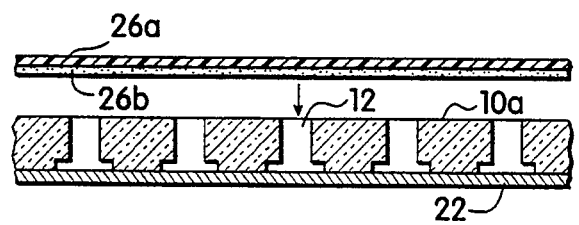
Figure 1C:
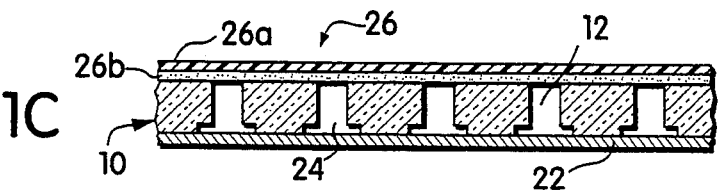

In the second step, as shown in FIGS. 1B and 1C, an adhesive sheet 26 is placed on the head substrate 10 over a surface 10 toward the openings 12. The adhesive sheet 26 is composed of a reinforcing sheet 26a in the form of a polyimide film, and an adhesive layer 26b of epoxy resin attached to one surface of the reinforcing sheet 26a. Preferably, the adhesive sheet is exemplified by "Able Film 550 Kptn" (tradename) of Ablestik Japan Co., Ltd. The reinforcing sheet 26a has a thickness of about 25 $\mu$m, for example, and the adhesive layer 26b has a thickness of about 10 $\mu$m, for example. When the adhesive sheet 26 is placed on the head substrate 10, the adhesive layer 26b should be in contact with the substrate.

In the third step (softening and attaching step), the head substrate 28b, with the reinforcing sheet 26a placed thereon as shown in FIG. 1C, is left as it is for several seconds so that the adhesive layer 26b at portions in contact with the head substrate 10 will be softened due to the temperature of the head substrate 10 and hence will be attached to the substrate.

Figure 1D:
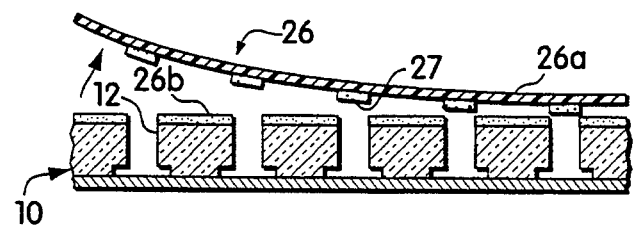

In the fourth step (peeling step), as shown in FIG. 1D, the adhesive sheet 26 is peeled off the head substrate 10 from the position of FIG. 1C. Of the adhesive layer 26b of the adhesive sheet 26, only the portions in contact with the head substrate 10 are transferred to the head substrate 10, while the remaining portions, i.e., the portions 27 aligned with the openings 12 are peeled off the head substrate 10 together with the reinforcing sheet 26a as they do not become soft and hence are not transferred to the substrate.

Thus, the adhesive layer 26b has been placed precisely on the opening-side surface 10a of the head substrate 10 without protruding into the openings 12.

Figure 1E:
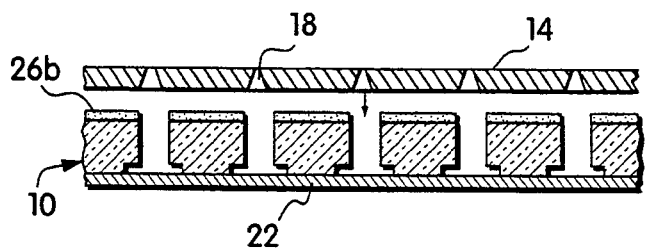

In the fifth step, as shown in FIG. 1E, a nozzle plate 14 is placed on the head substrate 10. The nozzle plate 14 has a plurality of Ink jet nozzles 18 spaced at distances so as to be aligned with the openings 12 of the head substrate 10. The diameter of the individual nozzle 18 is about 40 $\mu$m, for example.

Figure 1F:
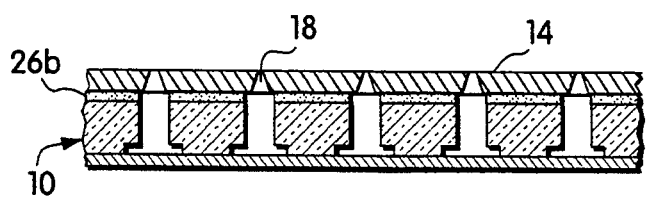

In the final step, the nozzle plate 14 is reheated (e.g., at 150° C. for 30 minutes) under a predetermined pressure (e.g., 70 g/cm$^2$) to heatset the adhesive layer 26b, thus finalizing the attaching of the nozzle plate 14 to the head substrate 10. During that time, the nozzle plate 14 should be kept placed on the head substrate 10 in such a manner that the center of the individual nozzle 18 is exactly aligned with that of the corresponding opening 12, as shown in FIG. 1F.

Thus the ink jet head has been completed.

FIGS. 2A through 2D are perspective views showing the principal steps of the manufacturing method of FIG. 1.

Figure 2A:
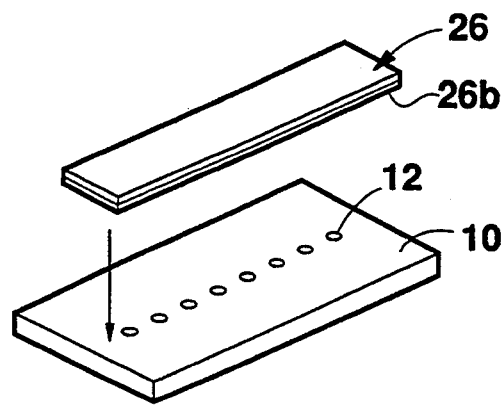
FIGS. 2A through 2D are perspective views showing the principal steps of the embodiment of FIG. 1.
Figure 2B:
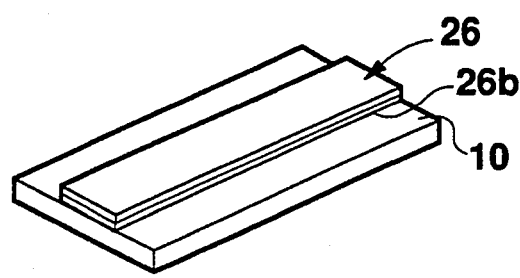
Figure 2C:
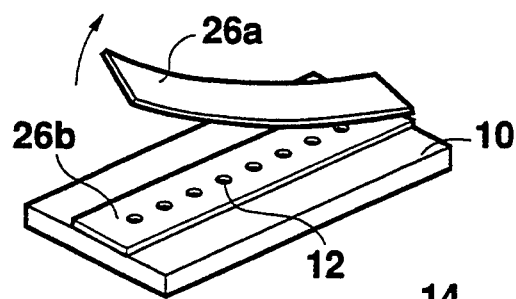
Figure 2D:
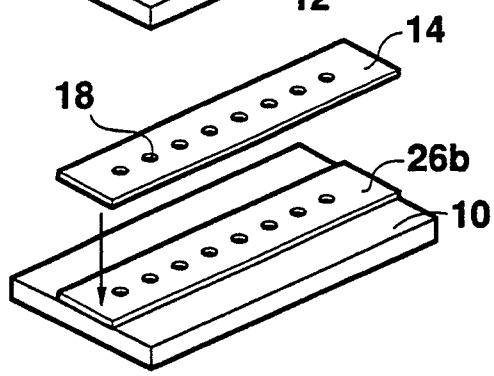

FIG. 1A is a perspective view corresponding to FIG. 1B. FIG. 2C is a perspective view corresponding to FIG. 1D. FIG. 2D is a perspective view corresponding to FIG. 1E.

Figure 3:
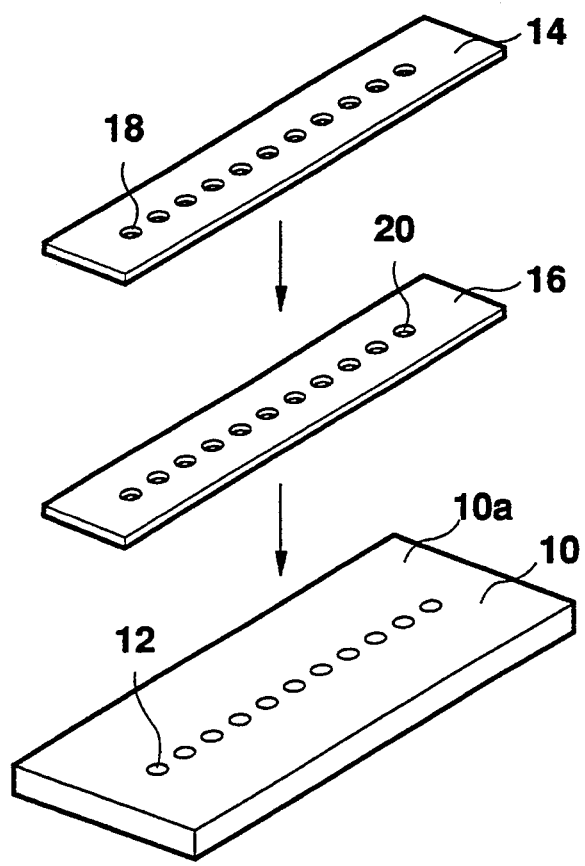
FIG. 3 is a perspective view showing a conventional method for manufacturing an ink jet head.

According to this embodiment, it is not necessary to previously provide the adhesive sheet 26 with small holes 20 (FIG. 3) at positions corresponding to the openings 12 of the head substrate 10. Therefore, not only the forming work of the small holes, which requires precise positioning, but also the attaching work of the adhesive sheet with the small holes 20 in alignment with the openings 12, which is laborious, would not be necessary. Partly since the adhesive sheet 26 is softened due to the temperature of the head substrate 10 and is thereby attached to the substrate as shown in FIGS. 1C and 2B, and partly since the adhesive sheet 26 is peeled off the head substrate 10 as shown in FIGS. 1D and 2C, the adhesive layer 26b can be transferred and attached to the head substrate 10 over the whole surface except the openings 12. Since the adhesive layer 26b can thus be positioned accurately without protruding into the openings 12, the adhesive layer 26b is kept from flowing into the openings 12 when reheated in the nozzle plate attaching step. Therefore it is possible to prevent the openings 12 from becoming clogged with the adhesive agent, which impedes the jetting of ink.

As described above, according to the ink jet head manufacturing method of this invention, it is possible to accomplish the attaching work of the nozzle plate to the head substrate, without providing the adhesive sheet with small holes, which is laborious and difficult. It is also possible to effectively prevent the adhesive agent from flowing into the openings of the head substrate, so that ink can flow through the openings smoothly, thus improving the reliability of the ink jet head. Further, even if the distance between the openings of the head substrate is small, it is possible to attach the adhesive layer accurately to the head substrate at the portions except the openings, thus realizing an increased degree of density of the head nozzles.

What is claimed is:

1. A method of manufacturing an ink jet head including a nozzle plate which is fixedly attached to a head substrate having a plurality of ink passageways and a plurality of ink ejection openings communicating with respective ink passageways, and which has a plurality of nozzle holes adapted to communicate with the respective ink ejection openings, said method comprising the steps of:

(a) heating the head substrate to a predetermined temperature;

(b) applying an adhesive sheet having a reinforcing layer and an adhesive layer onto the ink-ejection-opening-side surface of the heated head substrate so that the adhesive layer is aqainst the surface;

(c) peeling away, after said applying step, the reinforcing layer and the adhesive layer, wherein portions of the adhesive layer facing the ink ejection openings are removed and portions facing the substrate remain;

(d) positioning, after said peeling step, the nozzle plate on the remaining adhesive layer to communicate with the respective nozzle holes and the respective ink ejection openings; and (e) heatsetting, after said positioning step, the adhesive layer by heating under pressure to attach the nozzle plate to the head substrate.

2. An ink jet manufacturing method according to claim 1, wherein the adhesive layer is on one surface of the reinforcing layer.

3. An ink jet head manufacturing method according to claim 2, wherein the reinforcing layer includes a polyimide film and the adhesive layer includes an epoxy resin.

4. An ink jet head manufacturing method according to claim 1, wherein the head substrate includes a photosensitive material and the heating temperature in said heating step is in a range of 60° C. to 70° C.

5. An ink jet head manufacturing method according to claim 1, wherein the pressure, the heating temperature, and the heating time in said heatsetting step are about 70 grams/cm$^2$, about 150° C., and about 30 minutes, respectively.

6. An ink jet head manufacturing method according to claim 1, wherein the adhesive layer is about 10 microns thick.

* * * * *